United States Patent
Willis

(10) Patent No.: US 11,436,867 B2
(45) Date of Patent: Sep. 6, 2022

(54) REMOTE BIOMETRIC IDENTIFICATION AND LIGHTING

(71) Applicant: Alclear, LLC, New York, NY (US)

(72) Inventor: William Willis, New York, NY (US)

(73) Assignee: ALCLEAR, LLC, New York, NY (US)

(*) Notice: Subject to any disclaimer, the term of this patent is extended or adjusted under 35 U.S.C. 154(b) by 0 days.

(21) Appl. No.: 17/204,384

(22) Filed: Mar. 17, 2021

(65) Prior Publication Data

US 2021/0201020 A1 Jul. 1, 2021

Related U.S. Application Data

(62) Division of application No. 16/679,565, filed on Nov. 11, 2019, now Pat. No. 11,227,155.

(60) Provisional application No. 62/811,420, filed on Feb. 27, 2019, provisional application No. 62/796,075, filed on Jan. 23, 2019.

(51) Int. Cl.
*G06V 40/19* (2022.01)
*G06F 21/32* (2013.01)

(52) U.S. Cl.
CPC .............. *G06V 40/19* (2022.01); *G06F 21/32* (2013.01)

(58) Field of Classification Search
CPC ................................ G06V 40/19; G06F 21/32
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,744,966 B1 | 6/2014 | Amacker et al. |
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |
| 9,871,959 B1 | 1/2018 | Hlatky et al. |

(Continued)

*Primary Examiner* — Edward Park
(74) *Attorney, Agent, or Firm* — Brownstein Hyatt Farber Schreck, LLP

(57) ABSTRACT

A biometric capture device is operative to adjust one or more environmental parameters to enhance a range (e.g., distance) at which a biometric may be captured from a subject. For example, a sample biometric capture device may be, include, or otherwise incorporate a retinal or iris scanner configured to capture an image of the retina or iris (e.g., a biometric) when the retina or iris is illuminated by infrared light. Generally, the amount of infrared light required to accurately image the retina or iris increases with the distance of the subject's retina or iris from the image capture device. The biometric capture device may capture a facial image using a first image sensor, identify a face in the facial image, capture an iris image using a second image sensor guided by the facial image, and identify a person using the iris image.

20 Claims, 4 Drawing Sheets

(56) References Cited

U.S. PATENT DOCUMENTS

| | | | |
|---|---|---|---|
| 9,934,504 B2 | 4/2018 | Wang et al. | |
| 9,967,250 B2 | 5/2018 | Johansson et al. | |
| 10,027,662 B1 | 7/2018 | Mutagi et al. | |
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 10,987,049 B2 * | 4/2021 | Lee | A61B 5/444 |
| 11,151,481 B1 | 10/2021 | Sun et al. | |
| 2004/0221303 A1 | 11/2004 | Sie | |
| 2006/0279422 A1 | 12/2006 | Sweatte et al. | |
| 2008/0002863 A1 | 1/2008 | Northcott et al. | |
| 2008/0292144 A1 | 11/2008 | Kim et al. | |
| 2008/0316352 A1 | 12/2008 | Cheng et al. | |
| 2012/0293629 A1 * | 11/2012 | Min | G06V 40/19 348/46 |
| 2013/0089240 A1 * | 4/2013 | Northcott | G06V 40/19 348/78 |
| 2014/0132749 A1 * | 5/2014 | Hartman | A61B 3/113 348/78 |
| 2014/0189720 A1 | 7/2014 | Terrazas | |
| 2015/0294515 A1 | 10/2015 | Bergdale | |
| 2015/0358557 A1 * | 12/2015 | Terre | H04N 5/365 348/164 |
| 2015/0362700 A1 * | 12/2015 | Prabhakar | A61B 3/1216 348/78 |
| 2016/0012292 A1 | 1/2016 | Perna et al. | |
| 2016/0189063 A1 | 6/2016 | Nie | |
| 2016/0283789 A1 * | 9/2016 | Slaby | G06V 10/143 |
| 2017/0161578 A1 * | 6/2017 | Ivanisov | G06V 40/40 |
| 2017/0188103 A1 | 6/2017 | Pan | |
| 2017/0251366 A1 * | 8/2017 | Perna | G06Q 20/322 |
| 2018/0007060 A1 | 1/2018 | Leblang et al. | |
| 2018/0220952 A1 | 8/2018 | Lee et al. | |
| 2019/0036939 A1 | 1/2019 | Johansson et al. | |
| 2019/0050631 A1 | 2/2019 | Hayase | |
| 2019/0082101 A1 | 3/2019 | Baldwin et al. | |
| 2019/0269326 A1 * | 9/2019 | McWherter | A61B 3/15 |
| 2020/0234040 A1 | 7/2020 | Willis et al. | |
| 2020/0293757 A1 | 9/2020 | Nilsson et al. | |
| 2021/0290055 A1 * | 9/2021 | Clarida | A61B 3/0008 |
| 2022/0005208 A1 * | 1/2022 | Yang | G06V 10/25 |
| 2022/0043895 A1 * | 2/2022 | Nakazaki | G06F 21/45 |

* cited by examiner

REMOTE BIOMETRIC IDENTIFICATION AND LIGHTING

CROSS-REFERENCE TO RELATED APPLICATION(S)

This application is a divisional patent application of U.S. patent application Ser. No. 16/679,565, filed Nov. 11, 2019 and titled "Remote Biometric Identification and Lighting," which is a nonprovisional patent application of and claims the benefit of U.S. Provisional Patent Application No. 62/796,075, filed Jan. 23, 2019 and titled "Remote Biometric Identification and Lighting" and U.S. Provisional Patent Application No. 62/811,420, filed Feb. 27, 2019 and titled "Remote Biometric Identification and Lighting," the disclosures of which are hereby incorporated herein by reference in their entireties.

FIELD

Embodiments described herein relate generally to apparatuses for identifying an individual at a distance by remote biometric capture, and more particularly to dynamically adjusting one or more environmental parameters to enhance remote biometric capture and/or enable and/or enhance biometric capture in motion.

BACKGROUND

There are an increasing number of situations (such as airport security screenings, ticketing gates at venues, and so on) where processing of a line or other sequence of people may involve establishing a person's identity. Use of biometrics to establish a person's identity is increasingly common. Biometrics may be used to unlock electronic devices, retrieve sensitive information, enter secure areas (such as airport terminals, as one example), rent or purchase goods, and so on. Many common biometric capture devices require physical contact by a user, as is the case with most fingerprint readers. Other biometric capture devices require that a user stand relatively close to the device, as with an iris scanner or face recognition device. Requiring contact or close proximity during capture may be cumbersome, especially when multiple people are in line or otherwise waiting to interact with the biometric capture device Additionally, many situations where a person's identity may be established as part of processing a line or other sequence of people involve movement. Many biometric capture devices that require either contact or close proximity may require that the user remain substantially stationary during capture. Other biometric capture devices that are capable of establishing a person's identity in motion may not be reliable, may not function well, may be slow, and so on. Any slowdown or stoppage of the line may impair the number of people that can be processed and/or the speed at which the people can be processed.

SUMMARY

Generally, embodiments described herein take the form of an apparatus and/or method for capturing a biometric from a subject while the subject is moving. Further, embodiments described herein may adjust an environmental parameter to enhance the embodiment's ability to capture a biometric that may be used to identify the subject. The environmental parameter may be adjusted based on a distance between the embodiment and the subject, as one non-limiting example.

One sample embodiment described herein takes the form of an apparatus for adjusting an environmental parameter to enhance remote capture of a biometric, including: an emitter configured to adjust the environmental parameter; a detector configured to detect a distance from the detector to a subject; a processor operative to determine a level of the environmental parameter based on the distance detected by the detector; and a biometric sensor configured to capture a biometric of the subject; wherein the processor is operative to instruct the emitter to adjust the environmental parameter based on the distance.

In some embodiments, the biometric is a retinal scan or an iris scan and the environmental parameter is an intensity of infrared light. In certain embodiments, the environmental parameter is an intensity of light, such as white and/or other visible light. In still other embodiments, the environmental parameter is a focus of light emitted by the emitter.

Certain embodiments may be further operative to determine a speed of the subject and adjust the environmental parameter based on the subject's speed.

In some embodiments, an apparatus for capturing a biometric from a subject in motion may include a first image sensor to capture a facial image of a person, a processor to determine that the image includes a face, and a second image sensor to capture an iris image of the person wherein the processor uses the facial image to guide capture of the iris image. In various implementations of such embodiments, the apparatus may further include an emitter configured to adjust an environmental parameter and a detector configured to detect a distance from the detector to the person wherein the processor is operative to determine a level of the environmental parameter based on the distance detected by the detector and instruct the emitter to adjust the environmental parameter based on the distance. In a number of examples of such implementations, the emitter may include a white and/or other visible light emitter and an infrared emitter, and the processor may use the white and/or other visible light emitter to adjust white and/or other visible light during capture of the facial image using the first image sensor and the infrared emitter to adjust infrared light during capture of the iris image. This combined use of facial and iris images along with adjustment of environmental parameters, such as white and/or other visible and infrared light, may enable significantly high fidelity biometric identifications of people in motion. In a number of embodiments, the apparatus may be used with and/or integrated into a security scanning apparatus that detects contraband, such as metals, explosives, and so on.

In various embodiments, an apparatus for adjusting an environmental parameter to enhance remote capture of a biometric includes an emitter configured to adjust the environmental parameter, a detector configured to detect a distance from the detector to a subject, a processor operative to determine a level of the environmental parameter based on the distance detected by the detector, and a biometric sensor configured to capture a biometric of the subject. The processor is operative to instruct the emitter to adjust the environmental parameter based on the distance.

In some examples, the biometric is a retinal scan and the environmental parameter is an intensity of infrared light. In a number of examples, the biometric is an iris scan and the environmental parameter is an intensity of infrared light.

In various examples, the environmental parameter is an intensity of light. In some examples, the environmental parameter is a focus of light emitted by the emitter.

In a number of examples, the distance is a first distance and is detected at a first time, the detector is configured to detect a second distance from the detector to the subject at a second time, and the processor is operative to determine a speed of the subject from the first and second distances and the first and second times, determine a rate at which the environmental parameter should be varied, based on the speed of the subject, and instruct the emitter to vary the environmental parameter at the rate. In various examples, the biometric sensor is configured to capture the biometric when the processor determines that the distance is such that the environmental parameter enhances a likelihood that the biometric has sufficient detail to identify the subject, the distance is greater than zero, and the biometric sensor is configured to capture the biometric while the subject is moving.

In some embodiments, an apparatus for remote capture of a biometric during movement includes a first image sensor to capture a facial image of a person, a processor operative to determine whether the facial image includes a face, and a second image sensor to capture an iris image of the person. The processor uses the facial image to guide capture of the iris image.

In various examples, the apparatus further includes an emitter configured to adjust an environmental parameter and the processor is operative to determine a level of the environmental parameter based on a distance to the person and instruct the emitter to adjust the environmental parameter based on the distance. In some implementations of such examples, the apparatus further includes a detector configured to detect the distance to the person. In a number of implementations of such examples, the emitter is a visible light emitter (which may be a white light emitter in some examples) and an infrared emitter, the processor uses the visible light emitter to adjust visible light during capture of the facial image using the first image sensor, and the processor uses the infrared emitter to adjust infrared light during capture of the iris image. In various implementations of such examples, the emitter is a visible light emitter and the processor uses the visible light emitter to adjust visible light during capture of the facial image using the first image sensor. In some implementations of such examples, the emitter is an infrared emitter and the processor uses the infrared emitter to adjust infrared light during capture of the iris image.

In various examples, the first image sensor and the second image sensor have a different number of megapixels. In some examples, the second image sensor has at least one of square pixels, greyscale pixels, black and white pixels, or an autofocus lens. In a number of examples, the processor uses a focus table to dynamically determine depth of field when using the second image sensor to capture the iris image of the person. In some examples, the apparatus further includes a security scanning apparatus operable to detect at least one of contraband, a metal, or an explosive.

In a number of embodiments, a system for remote capture of a biometric during movement includes at least one image sensor to capture a facial image of a person and a processor. The processor is operative to determine whether the facial image includes a face and use the at least one image sensor to capture an iris image or a retina image of the person using the facial image.

In various examples, the processor uses the facial image to determine a location of an iris or a retina.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1:
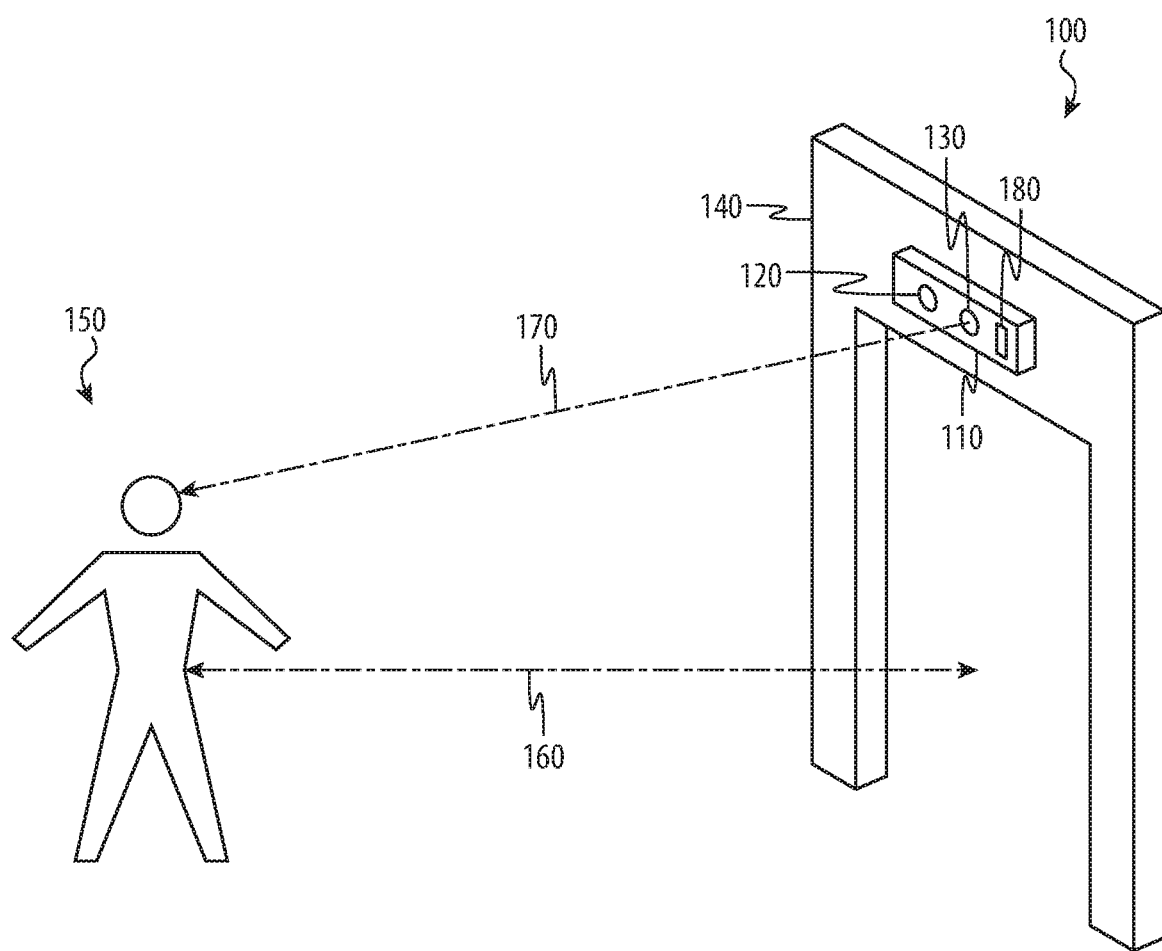
FIG. 1 shows a user approaching a biometric capture device at a first distance.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The present disclosure relates to an apparatus and/or method for capturing a biometric from a subject while the subject is moving. Further, embodiments described herein may adjust an environmental parameter to enhance the embodiment's ability to capture a biometric that may be used to identify the subject. The environmental parameter may be adjusted based on a distance between the embodiment and the subject, as one non-limiting example.

Embodiments described herein may take the form of a biometric capture device operative to adjust one or more environmental parameters to enhance a range (e.g., distance) at which a biometric may be captured from a subject. For example, a sample biometric capture device may be, include, or otherwise incorporate a retinal or iris scanner configured to capture an image of the retina (e.g., a biometric) or iris when the retina or iris is illuminated by infrared light. Generally, the amount of infrared light required to accurately image the retina or iris increases with the distance of the subject's retina or iris from the image capture device.

In this example, as a subject approaches the biometric capture device, the device may determine a distance to the subject. The device may increase or decrease an intensity of light emitted by the device (or by an associated device, such as a separate light source) toward or at the subject. Further, in some embodiments, the biometric capture device may adjust the infrared light output in multiple stages, decreasing the output in multiple steps or levels as the subject approaches the biometric capture device. Put another way, the biometric capture device may be configured to output lights of different intensities when the subject is at different distances, either in a granular or step fashion or in a substantially continuously varying fashion as the distance between the subject and device varies. (In this document, the terms "subject" and "user" are used interchangeably.)

It should be appreciated that the biometric capture device may use one or more 2D and/or 3D image sensors to capture any of a number of biometrics other than retinal or iris scans. For example, the biometric capture device may capture fingerprint images, capture facial images, perform facial recognition, capture a thermal image of a user's body or body portion, capture an iris image, perform eye vein recognition, perform full body imaging scans, identify a person using a combination of facial recognition and iris image capture, use facial analysis of an image to guide iris capture in motion, and so on.

Typically, the biometric may be captured while the subject is remote from the biometric capture device. The subject may be "remote" when he, she, or it is not touching the device or within a few centimeters of the device. In some embodiments, the subject may be one to ten meters away from the device when his, her, or its biometric is remotely captured, although this distance may be greater or smaller depending on the structure of the particular embodiment.

As may be appreciated, the environmental parameter that is adjusted or modified by embodiments described herein may vary depending on the particular biometric received, imaged, determined, read, or otherwise acquired (collectively, "captured") by the biometric capture device. A set of non-limiting example parameters that may be adjusted follows, each associated with an example biometric capture device.

Intensity and/or frequency of visible light may be adjusted if the biometric capture device includes one or more optical devices, such as one or more cameras and/or 2D and/or 3D image sensors. Optical devices may capture facial images for facial recognition, full-body images for body recognition, fingerprint images, retina images, iris images, images of the sclera of the eyes (or other parts of the eyes) for eye vein verification, and so on.

Intensity, focus, and/or frequency of infrared light may be adjusted if the biometric capture device is an infrared camera or other infrared imaging structure. Infrared imaging devices may capture retinal or iris patterns (e.g., perform retinal or iris scans), thermal images, images of the iris, images of the sclera of the eyes (or other parts of the eyes) for eye vein verification, and so on.

Intensity, focus, and/or frequency of ultrasonic waves may be adjusted if the biometric device is an ultrasonic imaging device. Ultrasonics may be used to capture fingerprints, blood vessel patterns, and the like.

Temperature may be adjusted if the biometric device is a thermal imager or measures a subject's body temperature in another manner.

Ultraviolet light may be adjusted in intensity, spread or focus, and/or frequency if the biometric capture device is an ultraviolet imager. As one non-limiting example, certain facial recognition techniques may use ultraviolet images of a subject's face or subdermal features of a subject's face.

Further, the biometric capture device (or an associated electronic device) may determine a speed of the subject as well as a distance of the subject from the device. The biometric capture device may be further operative to determine an optimal (or minimum) distance for capture of the biometric; this distance may be the distance at which the captured biometric has sufficient resolution, fidelity, integrity, and/or other features that are sufficient to allow the biometric to be used to identify the subject. Further, it should be appreciated that this minimum or optimal distance may be based, at least in part, on the environmental parameter and/or how much the biometric capture device (or an associated electronic device) can adjust the environmental parameter.

For example, if the environmental parameter is an intensity of infrared light, the biometric capture device may determine a minimum and/or optimal distance at which its emitter may emit infrared light with sufficient intensity to ensure, or render highly likely, that a captured biometric may be used to identify the subject. In some embodiments, "highly likely" means at least a 90% chance that the biometric may be used to identify the subject, while in others the chance that the biometric is of sufficient detail, resolution, complexity, integrity, fidelity, or the like is 95%, 98%, 99%, or more.

Some embodiments may capture multiple biometrics at multiple distances between the biometric capture device and the subject. Further, the environmental parameter may be varied depending on the distance, such that each instance of the captured biometric is captured while the environmental parameter is different. For example, a retinal scan may be captured at a first distance while the biometric capture device (or an associated device) emits high-intensity infrared light toward a subject's face and/or eyes, and a second retinal scan may be captured at a second, closer distance when the infrared light is emitted at a lower intensity. In some embodiments, the second instance of the biometric is captured only if the first captured biometric cannot be used to identify the subject. In certain embodiments, the first and second instances of the biometric may be captured without varying the environmental parameter, but while the distance changes.

Various embodiments may capture a first biometric in order to facilitate capture of a second biometric. For example, a first image sensor may be used to capture one or more facial images of a person. The facial image may be analyzed to determine that a human face is present. If so, a second image sensor may be used to capture one or more iris images of the person. The analysis of the facial image may be used to guide capture of the iris image, such as by analyzing the facial image to identify the location of the person's iris using other detected facial features. This combined use of facial and iris images may improve capture of iris images and/or identification of people using iris images. Further, a detector may be used to detect a distance of the person to the first image sensor and/or the second image sensor during capture of the facial image and/or the iris image. One or more environmental parameters may be adjusted using the detected distance to facilitate capture of the facial image and/or the iris image. For example, the intensity, focus, and/or other properties of one or more emitters that may be used with the first image sensor and/or the second image sensor may be adjusted. By way of illustration, the intensity of one or more white and/or other visible light emitters may be adjusted during capture of the facial image and the intensity of one or more infrared light emitters may be adjusted during capture of the iris image. This combined use of facial and iris images along with adjustment of environmental parameters, such as white and/or other visible and infrared light, may enable significantly high fidelity biometric identifications of people in motion. For example, the above may enable biometric identification of people moving approximately four feet per second at a fidelity of at least one in ten million whereas facial recognition may typically have a fidelity of one in a hundred and contact-based fingerprint scanning may typically have a fidelity of one in ten thousand.

FIG. 1 illustrates a sample biometric capture system 100. The biometric capture system 100 may include a subsystem 110 incorporating one or more detectors 120 and one or more emitters 130, although in other embodiments, the detector and emitter may be the same element or may not be included in the same subsystem. The subsystem 110 (or detector 120, and/or emitter 130) may be affixed to, incorporated in, or be part of a housing 140. The housing 140 shown in FIG. 1 is merely one example, here illustrated as an arch or doorframe through which a subject 150 may approach and through which the subject may pass. In other embodiments, the housing 140 may be a tunnel, arch, pylon, or stake by which the subject 150 passes, and so on.

In FIG. 1 the subject 150 is a first distance 160 away from the biometric capture system 100. At this distance 160, the detector 120 detects a presence of the subject 150. In response, the biometric capture system 100 determines if the subject 150 is close enough to capture an effective biometric (e.g., a biometric that may be used to identify the subject), and/or whether the subject is close enough to capture an effective biometric if an environmental parameter is altered. If necessary, the emitter 130 emits electromagnetic radiation 170 (for example, visible light, white light, non-visible light, heat, infrared light, a magnetic field, and so on) to adjust an environmental parameter. Sample environmental parameters include an amount, intensity, or frequency of visible or non-visible light on the subject, a temperature, a magnetic field strength, and so on.

Once the subject 150 is at an appropriate distance and the environmental parameter is of the appropriate value (e.g., strength, intensity, and so on), one or more biometric sensors 180 (such as one or more image sensors) capture one or more biometrics of the subject 150. As the subject 150 approaches the biometric capture system 100, the biometric may be used to identify the subject 150 in order to grant him or her access to a location (such as an airline terminal, store, rental car lot, stadium, or other restricted area), provide a good or service to the subject 150, provide information to the subject 150, initiate, approve, or complete a transaction with the subject 150, and so on.

Figure 2:
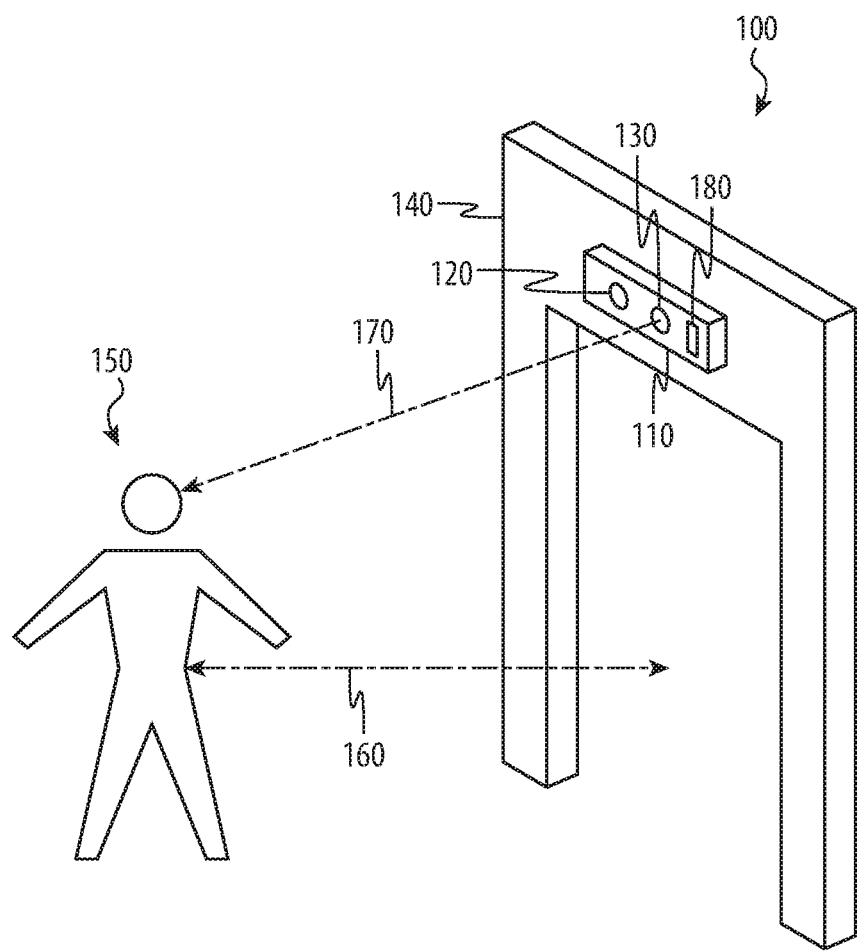
FIG. 2 shows a user approaching the biometric capture device of FIG. 1 and at a second distance.

In some instances a subject 150 may be detected by the detector 120 when the distance 160 between the subject 150 and biometric capture system 100 is too far for an effective biometric to be captured. Accordingly and as shown in FIG. 2, the biometric capture system 100 may wait until the distance 160 between the subject 150 and biometric capture system 100 decreases below a threshold and then activate the emitter 130. In certain embodiments, the distance 160 may be measured multiple times so that the biometric capture system 100 (or an associated electronic device) may estimate the subject's speed. The subject's speed may be used to determine a time at which the emitter 130 and the biometric sensor 180 are activated. In still other embodiments, a subject's speed may be used to determine a continuous variation of the electromagnetic radiation 170, such that the electromagnetic radiation 170 varies as the subject approaches the biometric capture system 100. This change in emitted electromagnetic radiation 170 may be smooth or may be a step function with the distance 160.

In some embodiments, the emitter 130 may vary the emitted electromagnetic radiation 170 to vary the environmental parameter rapidly. For example, the environmental parameter may be changed multiple times in a single second before the subject 150 moves and appreciably changes the distance 160. The biometric sensor 180 may capture a different instance of the subject's biometric every time the electromagnetic radiation 170 changes, and thus every time the environmental parameter changes. Accordingly, the biometric capture system 100 may capture multiple instances of a biometric at a substantially static distance 160 but under varying environmental parameters. This may permit rapid and efficient capture of at least one effective biometric at a given distance 160.

By way of example, the biometric sensor 180 may include an image sensor that captures a series of images (continuously, periodically, or otherwise) of the subject 150. The biometric capture device 100 may operate the emitter 130 in order to maintain consistent lighting or other environmental parameters across the series of images and/or make the lighting and/or other environmental parameters more consistent than they would otherwise be. This may result in the series of images being more uniform, increase the effective resolution of the images, reduce variation between the series of images, compensate for fall off, obtain enhanced resolution for the series of images, and so on.

In some embodiments, the biometric sensor 180 may include a first image sensor to capture one or more facial images of the subject 150 and a second image sensor to capture one or more iris images of the subject 150. The biometric capture system 100 may use the first image sensor to capture the facial image and analyze the facial image to determine whether or not the facial image includes a human face. If so, the biometric capture system 100 may use the second image sensor to capture the iris image of the subject 150. The biometric capture device 100 may then use the iris image to identify the subject 150.

The biometric capture system 100 may use the facial image to guide use of the second image sensor to capture the iris image of the subject 150. For example, the biometric capture system 100 may reduce unnecessary attempts at capturing iris images by using the second image sensor to capture the iris image of the subject 150 after a human face is detected in the facial image (such as detection of a human face in the facial image according to International Organization for Standardization or "ISO" compliant standards). By way of another example, analysis of the facial image may enable iris location using other detected facial features (such as locating an iris based on the location of an identified nose). This combined use of facial and iris images may improve capture of iris images and/or identification of people using iris images. This may also aid in capturing iris images of moving people, such as people moving approximately four feet a second or less.

Further, many biometric capture systems that identify people using facial recognition may use algorithms that are more effective for identifying males of European heritage than females or people of other heritages. By detecting that a face is present in a facial image, using the facial image to locate the position of one or more irises, and performing identifications using images of the one or more irises, identification with a high degree of effectiveness may be possible across a significantly more uniform population spectrum including a wider variety of genders and heritages than would be possible using typical facial recognition techniques.

In some examples, the first image sensor and the second image sensor may be different kinds of image sensors. For example, the first image sensor that is used to capture the facial image of the subject 150 may be a first camera with at least approximately 3 megapixels (and/or one or more lenses and/or other optical elements of a sufficient quality that the first camera is capable of an effective resolution of at least approximately 3 megapixels) that is operable to capture facial images of people approximately 2 to 8 feet away at approximately 4 feet per second and the second image sensor that is used to capture the iris image of the subject 150 may be a second camera with at least approximately 5 megapixels (and/or one or more lenses and/or other optical elements of a sufficient quality that the second camera is capable of an effective resolution of at least approximately 5 megapixels). In various implementations, the second camera may have square pixels, an approximately ⅔ inch sensor, greyscale or black and white pixels, be operable to capture at least approximately 80 frames a second, and so on. In some implementations, the second camera may be operable within an illumination bandwidth of approximately 700-900 nanometers. In a number of implementations, the second camera may be an autofocus lens camera. In such implementations, a focus table and/or similar mechanism (such as using an active mechanism that uses the detector 120 and/or similar mechanism to select depth of field related to the distance to the subject 150; a passive mechanism such as analysis of one or more captured images to determine the distance, analysis of the sharpness and/or sharp edges of one or more captured images, and so on; a hybrid combination of active and passive mechanisms; and so on) may be used for dynamic focus to enable selection of the appropriate depth of field for the subject 150 at different distances as the subject 150 is walking.

Further, the biometric capture device 100 may use the detector 120 and the emitter 130 to improve capture of facial images and/or iris images. The biometric capture system 100 may use the detector 120 to detect a distance of the subject 150 to the first image sensor and/or the second image sensor during capture of the facial image and/or the iris image. The biometric capture system 100 may accordingly adjust one or more environmental parameters using the detected distance to facilitate capture of the facial image and/or the iris image. For example, the biometric capture system 100 may adjust the intensity, focus, and/or other properties of one or more emitters 130 that may be used with the first image sensor and/or the second image sensor. By way of illustration, the biometric capture system 100 may adjust the intensity of one or more white and/or other visible light emitters that are included in the emitter 130 during capture of the facial image and the intensity of one or more infrared light emitters that are included in the emitter 130 during capture of the iris image. This combined use of facial and iris images along with adjustment of environmental parameters, such as white and/or other visible light and infrared light, may enable significantly high fidelity biometric identifications of people in motion. For example, the above may enable biometric identification of people moving approximately four feet per second at a fidelity of one in ten million whereas facial recognition may typically have a fidelity of one in a hundred and contact-based fingerprint scanning may typically have a fidelity of one in ten thousand.

In a number of embodiments, the biometric capture system 100 may be used with and/or integrated into a security scanning apparatus that detects contraband, such as metals, explosives, and so on. For example, the security screening apparatus may be disposed within the housing 140. Alternatively, the security screening apparatus may be a structure, such as an arch or doorframe, located adjacent to the biometric capture system 100 such that the subject 150 proceeds through the biometric capture system 100 and then through the security screening apparatus.

Although FIGS. 1 and 2 illustrate and describe a particular configuration of components, it is understood that this is an example. In other implementations, various configurations of the same, similar, and/or different components may be used without departing from the scope of the present disclosure.

By way of illustration, FIGS. 1 and 2 depict a single biometric sensor 180 disposed in the subsystem 110 on the housing 140. However, it is understood that that is an example. In some implementations, the biometric sensor 180 may be implemented as one or more image sensors without departing from the scope of the present disclosure. For example, the image sensors may be one or more cameras located in one or more crowns atop the housing 140. Various configurations are possible and contemplated without departing from the scope of the present disclosure.

By way of another illustration, FIGS. 1 and 2 depict a single emitter 130 disposed in the subsystem 110 on the housing 140. However, it is understood that that is an example. In some implementations, the emitter 130 may include a number of emitters without departing from the scope of the present disclosure. For example, a number of white and/or other visible light emitters and/or infrared emitters may be configured in a U or horseshoe shape on the housing 140, in one or more strips on the sides of the housing 140, in one or more rings on the housing 140, and so on. Various configurations are possible and contemplated without departing from the scope of the present disclosure.

By way of yet another example, FIGS. 1 and 2 depict the detector 120 detecting a presence of the subject 150 and/or a distance to the subject 150. However, in other examples, the detector 120 may be omitted. By way of illustration, a high-end single-lens reflex camera may be used as the biometric sensor 180 and may be operable to adjust focus and lighting rather than using the detector 120 to determine a distance. In other examples, the emitter 130 may be operated based on processing of a sequence of images captured using the biometric sensor 180 and/or the sequence of images may be processed to determine the distance (such as by analyzing fall off, analyzing sharp edges and/or other sharpness of the sequence of images, and so on). Various configurations are possible and contemplated without departing from the scope of the present disclosure.

Figure 3:
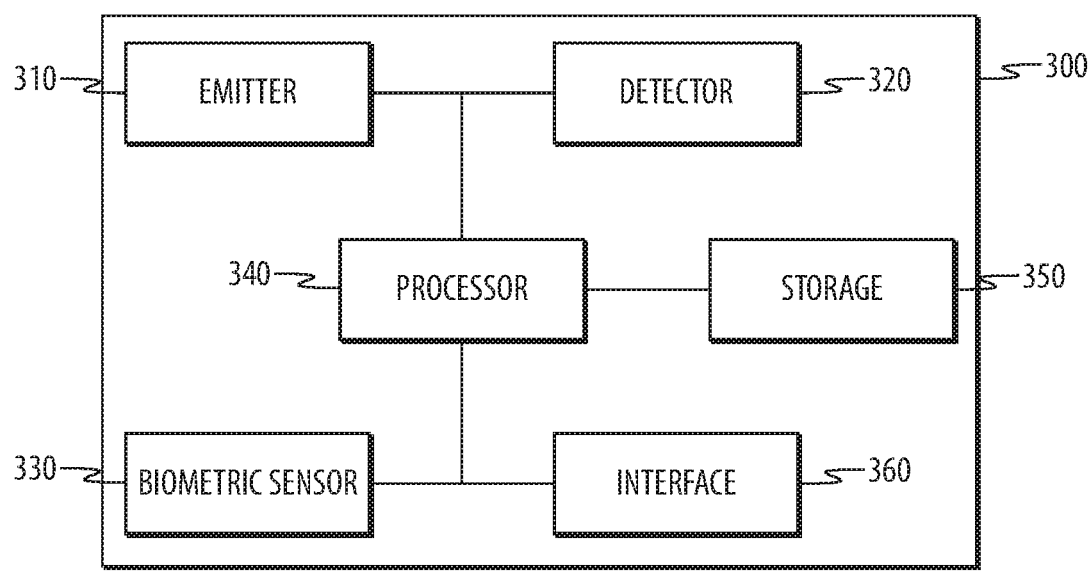
FIG. 3 is a schematic of a sample biometric capture device.

FIG. 3 is a block diagram illustrating sample components of one embodiment of a biometric capture device 300. One or more emitters 310 generally emit electromagnetic radiation to vary an environmental parameter, as discussed above. One or more detectors 320 detect a presence of a user and/or a distance to him or her. The detector 320 may be an optical camera, a laser transceiver, an ultrasonic transceiver, and so on. In some embodiments, the detector 320 may be a receiver only and may rely on electromagnetic radiation (light, for example) emitted from the emitter 310 and reflected from the subject rather than being a transceiver.

One or more biometric capture devices 300 generally include a biometric sensor 330 operative to capture a biometric, as described above.

One or more processors 340 receive data from one or more of the emitter 310, detector 320, biometric sensor 330, and interface 360. The processor may instruct the emitter, detector, and/or biometric sensor when and how to operate, including for how long. Thus, the processor may receive data indicating a distance between the device and the subject and use that data to instruct the emitter when to activate, how long to emit electromagnetic radiation, the intensity and/or frequency of such radiation, a field of emission (e.g., a focus of the emitter), and so on. The processor may also instruct the biometric sensor when to operate in order to capture a biometric.

Non-transitory storage 350 may contain computer-readable instructions and/or data structures that are accessed by the processor 340. The storage may contain a look-up table or code of different parameters for the electromagnetic radiation emitted by the emitter 310 and correlate those parameters to various distances between the subject and the device 300, for example.

The interface 360 may permit a third party access to the internal functions of the biometric capture device 300. The interface 360 may permit the third party to set or reprogram the biometric capture device's 300 functions or parameters, as one example. The third party may adjust various parameters of the emitter, as yet another example, in order to change an amount, intensity, frequency, focus, or other aspect of the emitted electromagnetic radiation. As still another example, the interface 360 may permit a third party (such as an operator or technician) access to the storage 350 and any data contained therein, as well as the ability to manipulate such data. Thus, through the interface 360, the third party may alter the aforementioned look-up table or code. The interface 360 may be physically accessible, such as via an external port, or may be a wireless receiver and/or transmitter.

Figure 4:
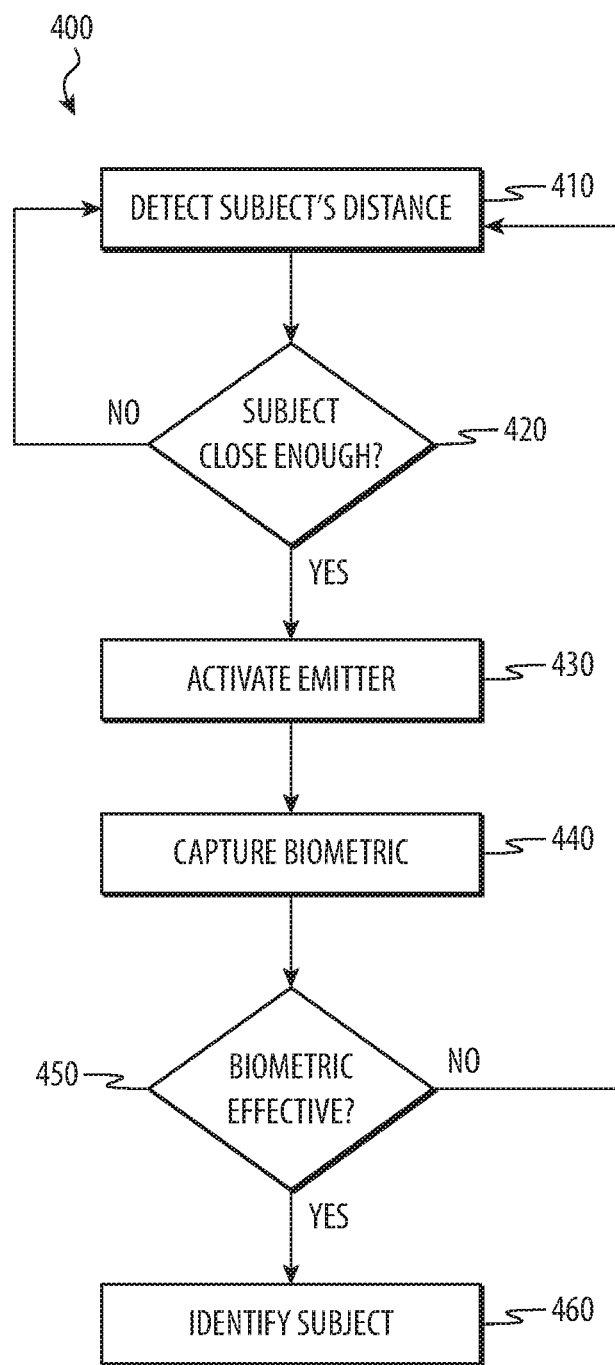
FIG. 4 is a flowchart of a sample operation for remotely capturing an effective biometric.

FIG. 4 is a flowchart illustrating one sample method of operation of one embodiment of a biometric capture device as described herein. The method 400 begins in operation 410, in which a distance between the subject and the device may be detected by a detector.

Following operation 410, the device may determine in operation 420 whether the subject is close enough to the device that an effective biometric may be captured. If not, the process may return to operation 410. Generally, operation 410 may be performed by a processor of the device.

If the subject is close enough that an effective biometric can be captured, in operation 430 the emitter may be activated in order to emit electromagnetic radiation and alter an environmental parameter. The aspects of the electromagnetic radiation may vary with the distance detected in operation 410, the current state of the environmental parameter, the physical properties of the subject, an angle between the subject and the biometric capture device, and so on. Although not explicitly set out in this flowchart 400, it should be understood that any or all of these factors may be detected by certain embodiments of a biometric capture device, or such factors may be stored in the storage of the device for use in operation 430. Typically, the processor may activate the emitter.

In operation 440, the biometric sensor may capture a biometric of the subject. Generally, the processor may instruct the biometric sensor to perform this operation.

In operation 450, the biometric capture device may determine if the biometric is effective (e.g., can be used to identify the subject). If not, the method 400 may return to operation 410. If so, the method 400 may proceed to operation 460. As with certain prior operations, the processor may generally execute operation 450, although in some embodiments a separate processor may execute this operation. This separate processor may be physically part of the biometric capture device or may be remote from the device.

In operation 460, the effective biometric (and/or a hash and/or other digital representation thereof) may be used to identify the subject.

In various examples, this example method 400 may be implemented using a group of interrelated software modules or components that perform various functions discussed herein. These software modules or components may be executed within a cloud network and/or by one or more computing devices, such as the biometric capture system 100 of FIG. 1 and/or the biometric capture device 300 of FIG. 3.

Although the example method 400 is illustrated and described as including particular operations performed in a particular order, it is understood that this is an example. In various implementations, various orders of the same, similar, and/or different operations may be performed without departing from the scope of the present disclosure.

For example, in some implementations, a first image sensor may be used to capture one or more facial images of a person. The facial image may be analyzed to determine that a human face is present. If so, a second image sensor may be used to capture one or more iris images of the person. The analysis of the facial image may be used to guide capture of the iris image, such as by analyzing the facial image to identify the location of the person's iris using other detected facial features.

Further, in various implementations, a detector may be used to detect a distance of the person to the first image sensor and/or the second image sensor during capture of the facial image and/or the iris image. One or more environmental parameters may be adjusted using the detected distance to facilitate capture of the facial image and/or the iris image. For example, the intensity, focus, and/or other properties of one or more emitters that may be used with the first image sensor and/or the second image sensor may be adjusted. By way of illustration, the intensity of one or more white and/or other visible light emitters may be adjusted during capture of the facial image and the intensity of one or more infrared light emitters may be adjusted during capture of the iris image.

Although the above illustrates and describes a number of embodiments, it is understood that these are examples. In various implementations, various techniques of individual embodiments may be combined without departing from the scope of the present disclosure.

In various implementations, an apparatus for adjusting an environmental parameter to enhance remote capture of a biometric may include an emitter configured to adjust the environmental parameter, a detector configured to detect a distance from the detector to a subject, a processor operative to determine a level of the environmental parameter based on the distance detected by the detector, and a biometric sensor configured to capture a biometric of the subject. The processor may be operative to instruct the emitter to adjust the environmental parameter based on the distance.

In some examples, the biometric may be a retinal scan and the environmental parameter may be an intensity of infrared light. In a number of examples, the biometric may be an iris scan and the environmental parameter may be an intensity of infrared light.

In various examples, the environmental parameter may be an intensity of light. In some examples, the environmental parameter may be a focus of light emitted by the emitter.

In a number of examples, the distance may be a first distance and is detected at a first time, the detector may be configured to detect a second distance from the detector to the subject at a second time, and the processor may be operative to determine a speed of the subject from the first and second distances and the first and second times, determine a rate at which the environmental parameter should be varied, based on the speed of the subject, and instruct the emitter to vary the environmental parameter at the rate. In various examples, the biometric sensor may be configured to capture the biometric when the processor determines that the distance is such that the environmental parameter enhances a likelihood that the biometric has sufficient detail to identify the subject, the distance is greater than zero, and the biometric sensor is configured to capture the biometric while the subject is moving.

In some implementations, an apparatus for remote capture of a biometric during movement may include a first image sensor to capture a facial image of a person, a processor operative to determine whether the facial image includes a face, and a second image sensor to capture an iris image of the person. The processor may use the facial image to guide capture of the iris image.

In various examples, the apparatus may further include an emitter configured to adjust an environmental parameter and the processor may be operative to determine a level of the environmental parameter based on a distance to the person and instruct the emitter to adjust the environmental parameter based on the distance. In some such examples, the apparatus may further include a detector configured to detect the distance to the person. In a number of such examples, the emitter may be a visible light emitter (which may be a white light emitter in some examples) and an infrared emitter, the processor may use the visible light emitter to adjust visible light during capture of the facial image using the first image sensor, and the processor may use the infrared emitter to adjust infrared light during capture of the iris image. In various such examples, the emitter may be a visible light emitter and the processor may use the visible light emitter to adjust visible light during capture of the facial image using the first image sensor. In some such examples, the emitter may be an infrared emitter and the processor may use the infrared emitter to adjust infrared light during capture of the iris image.

In various examples, the first image sensor and the second image sensor may have a different number of megapixels. In some examples, the second image sensor may have at least one of square pixels, greyscale pixels, black and white pixels, or an autofocus lens. In a number of examples, the processor may use a focus table to dynamically determine depth of field when using the second image sensor to capture the iris image of the person. In some examples, the apparatus may further include a security scanning apparatus operable to detect at least one of contraband, a metal, or an explosive.

In a number of implementations, a system for remote capture of a biometric during movement may include at least one image sensor to capture a facial image of a person and a processor. The processor may be operative to determine whether the facial image includes a face and use the at least one image sensor to capture an iris image or a retina image of the person using the facial image.

In various examples, the processor may use the facial image to determine a location of an iris or a retina.

As discussed above and illustrated in the accompanying figures, the present disclosure relates to an apparatus and/or method for capturing a biometric from a subject while the subject is moving. Further, embodiments described herein may adjust an environmental parameter to enhance the embodiment's ability to capture a biometric that may be used to identify the subject. The environmental parameter may be adjusted based on a distance between the embodiment and the subject, as one non-limiting example.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An apparatus for adjusting an environmental parameter to enhance remote capture of a biometric, comprising:
an emitter configured to adjust the environmental parameter;
a detector configured to:
detect, at a first time, a first distance from the detector to a subject; and
detect, at a second time, a second distance from the detector to the subject;
a processor operative to:
determine a level of the environmental parameter based on the distance detected by the detector;
determine a speed of the subject from the first and second distances and the first and second times;
determine a rate at which the environmental parameter should be varied, based on the speed of the subject; and
instruct the emitter to vary the environmental parameter at the rate; and
a biometric sensor configured to capture a biometric of the subject; wherein:
the processor is operative to instruct the emitter to adjust the environmental parameter based on the first distance.

2. The apparatus of claim 1, wherein:
the biometric is a retinal scan; and
the environmental parameter is an intensity of infrared light.

3. The apparatus of claim 1, wherein:
the biometric is an iris scan; and
the environmental parameter is an intensity of infrared light.

4. The apparatus of claim 1, wherein the environmental parameter is an intensity of light.

5. The apparatus of claim 1, wherein the environmental parameter is a focus of light emitted by the emitter.

6. The apparatus of claim 1, wherein the biometric sensor comprises an image sensor.

7. The apparatus of claim 1, wherein:
the biometric sensor is configured to capture the biometric when the processor determines that the distance is such that the environmental parameter enhances a likelihood that the biometric has sufficient detail to identify the subject;
the distance is greater than zero; and
the biometric sensor is configured to capture the biometric while the subject is moving.

8. The apparatus of claim 1, wherein the processor instructs the biometric sensor to capture the biometric when the distance is less than a threshold.

9. The apparatus of claim 1, wherein the processor instructs the biometric sensor to capture the biometric after instructing the emitter to adjust the environmental parameter when the distance is less than a threshold.

10. An apparatus for enhancing remote capture of a biometric, comprising:
a biometric sensor configured to capture a biometric of a subject; and
a processor operative to:
determine a level of an environmental parameter based on a distance detected to the subject, the distance to the subject determined at multiple times;
use the distance determined at the multiple times to estimate a movement speed of the subject;
instruct an emitter to adjust the environmental parameter according to the distance; and
use the movement speed of the subject to determine a time to activate the emitter and the biometric sensor.

11. The apparatus of claim 10, wherein:
the emitter is an infrared emitter;
the processor instructs the emitter to emit infrared light at a first intensity when the distance is a first distance; and
the processor instructs the emitter to emit the infrared light at a second intensity when the distance is a second distance; wherein:
the second intensity is less than the first intensity; and
the second distance is less than the first distance.

12. The apparatus of claim 10, wherein the processor waits to instruct the biometric sensor to capture the biometric when the distance is greater than a threshold.

13. The apparatus of claim 10, wherein the emitter comprises a light emitter.

14. An apparatus for enhancing remote capture of a biometric, comprising:
a biometric sensor configured to capture a biometric of a subject; and
a processor operative to:
determine a level of an environmental parameter based on a distance detected to the subject, the distance determined at multiple times;
instruct an emitter to adjust the environmental parameter according to the distance;
use the distance determined at the multiple times to estimate a movement speed of the subject; and
use the movement speed of the subject to determine a time to activate the biometric sensor.

15. An apparatus for adjusting an environmental parameter to enhance remote capture of a biometric, comprising:
a non-transitory storage medium storing instructions; and
a processor operative to execute the instructions to:
determine a distance to a subject at multiple times using a detector;
instruct an emitter to adjust the environmental parameter based on the distance; and
obtain a biometric of the subject from a biometric sensor;
use the distance determined at the multiple times to estimate a movement speed of the subject; and
use the movement speed of the subject to determine a continuous variation of electromagnetic radiation emitted by the emitter such that the electromagnetic radiation varies as the subject approaches the biometric sensor.

16. The apparatus of claim 15, wherein:
the biometric comprises a series of images of the subject; and
the processor instructs the emitter to maintain the environmental parameter consistently across the series of images.

17. The apparatus of claim 15, wherein the biometric comprises at least one of a retina or an iris.

18. The apparatus of claim 17, wherein a change in the electromagnetic radiation as the electromagnetic radiation varies is smooth.

19. The apparatus of claim 17, wherein a change in the electromagnetic radiation as the electromagnetic radiation varies is a step function with the distance.

20. The apparatus of claim 15, wherein:
the emitter changes the environmental parameter multiple times in a single second before the subject moves and changes the distance; and the biometric sensor captures a different instance of the biometric when the environmental parameter changes.

* * * * *